US011401661B2

(12) United States Patent
Segal

(10) Patent No.: US 11,401,661 B2
(45) Date of Patent: Aug. 2, 2022

(54) RECYCLABLE COMPOSITION FOR WATERPROOFING PAPER UTILIZING A PLANT DERIVED WAX, PELLETS OF THE COMPOSITION, RECYCLABLE WATERPROOF PAPER LAMINATE INCLUDING THE COMPOSITION, RECYCLABLE HOT BEVERAGE CUP INCLUDING THE LAMINATE, POD FOR MAKING HOT BEVERAGES INCLUDING THE LAMINATE, AND DRINKING STRAW INCLUDING THE LAMINATE

(71) Applicant: J & J Green Paper, Inc., Hallandale Beach, FL (US)

(72) Inventor: Michael Scott Segal, Miami, FL (US)

(73) Assignee: J & J Green Paper, Inc., Hallandale Beach, FL (US)

(*) Notice: Subject to any disclaimer, the term of this patent is extended or adjusted under 35 U.S.C. 154(b) by 602 days.

(21) Appl. No.: 16/191,426

(22) Filed: Nov. 14, 2018

(65) Prior Publication Data

US 2019/0249369 A1   Aug. 15, 2019

Related U.S. Application Data

(60) Provisional application No. 62/659,186, filed on Apr. 18, 2018, provisional application No. 62/599,234,
(Continued)

(51) Int. Cl.
*D21H 21/16* (2006.01)
*C09D 5/00* (2006.01)
(Continued)

(52) U.S. Cl.
CPC ............ *D21H 21/16* (2013.01); *A47G 21/18* (2013.01); *B01J 2/20* (2013.01); *B32B 9/02* (2013.01);
(Continued)

(58) Field of Classification Search
CPC ...................................................... C08L 91/06
See application file for complete search history.

(56) References Cited

U.S. PATENT DOCUMENTS

| 375,962 A | 1/1888 | Straw NAME |
| 1,174,279 A | 3/1916 | Pritham |

(Continued)

FOREIGN PATENT DOCUMENTS

| AU | 2094788 A | 2/1989 |
| CA | 2472851 A1 | 1/2006 |

(Continued)

OTHER PUBLICATIONS

Computer-generated English-language translation of CN 102493266 A.*

(Continued)

*Primary Examiner* — Vu A Nguyen
(74) *Attorney, Agent, or Firm* — Pearson IP; Loren Donald Pearson

(57) ABSTRACT

A composition that includes plant derived wax having a melting point of at least 70° C. can be used to waterproof cellulose based materials like paper and board. Suitable waxes include sugarcane wax and rice-bran wax. A surfactant such as stearic acid improves the adhesion of the composition to the underlying material. The resulting waterproof laminate can be economically recycled. Hot beverage cups made from the laminate are waterproof and recyclable without first being separated into components. Coffee pods and drinking straws that are waterproof and recyclable are manufactured with the waterproof laminate.

20 Claims, 8 Drawing Sheets

Related U.S. Application Data filed on Dec. 15, 2017, provisional application No. 62/585,962, filed on Nov. 14, 2017.

(51) Int. Cl.

| | | |
|---|---|---|
| *C09D 7/45* | (2018.01) | |
| *C09D 191/06* | (2006.01) | |
| *C08L 91/06* | (2006.01) | |
| *D21H 19/18* | (2006.01) | |
| *B01J 2/20* | (2006.01) | |
| *B32B 29/00* | (2006.01) | |
| *B32B 9/02* | (2006.01) | |
| *B65D 85/804* | (2006.01) | |
| *A47G 21/18* | (2006.01) | |
| *B65D 65/42* | (2006.01) | |
| *B65D 81/38* | (2006.01) | |
| *B65B 29/02* | (2006.01) | |
| *B29K 91/00* | (2006.01) | |
| *B65D 3/22* | (2006.01) | |

(52) U.S. Cl.
CPC ............ *B32B 29/002* (2013.01); *B65D 65/42* (2013.01); *B65D 81/3876* (2013.01); *B65D 85/8043* (2013.01); *B65D 85/8046* (2013.01); *C09D 5/00* (2013.01); *C09D 7/45* (2018.01); *C09D 191/06* (2013.01); *D21H 19/18* (2013.01); *B29K 2091/00* (2013.01); *B32B 2307/7265* (2013.01); *B32B 2553/00* (2013.01); *B65B 29/025* (2017.08); *B65D 3/22* (2013.01)

(56) References Cited

U.S. PATENT DOCUMENTS

| | | | |
|---|---|---|---|
| 1,468,959 A | 9/1923 | Clapp | |
| 1,592,294 A | 7/1926 | Clapp | |
| 1,739,582 A | 12/1929 | Ellis | |
| 2,010,297 A * | 8/1935 | Flaxman | C09G 1/08 106/8 |
| 2,750,095 A | 6/1956 | Alden | |
| 3,759,620 A | 9/1973 | Cushing et al. | |
| 3,972,467 A | 8/1976 | Whillock et al. | |
| 4,455,184 A | 6/1984 | Thompson | |
| 4,748,196 A | 5/1988 | Kuroda et al. | |
| 5,039,560 A | 8/1991 | Durgin et al. | |
| 5,286,238 A | 2/1994 | Pearlstein et al. | |
| 5,286,538 A | 2/1994 | Pearlstein et al. | |
| 5,503,883 A | 4/1996 | Kell, Jr. et al. | |
| 6,007,862 A | 12/1999 | Robyt et al. | |
| 6,410,674 B2 | 6/2002 | Huttermann et al. | |
| 6,811,824 B2 | 11/2004 | Hassan et al. | |
| 7,255,776 B2 | 8/2007 | Shoshany et al. | |
| 7,311,230 B2 | 12/2007 | Yeh et al. | |
| 7,671,122 B2 * | 3/2010 | Odajima | C08L 91/06 524/277 |
| 8,329,268 B2 | 12/2012 | Bell et al. | |
| 8,445,070 B2 | 5/2013 | Chang et al. | |
| 8,563,140 B2 | 10/2013 | Dellinger et al. | |
| 8,652,617 B2 | 2/2014 | Riebel et al. | |
| 9,145,224 B2 | 9/2015 | West et al. | |
| D777,029 S | 1/2017 | Stratton | |
| 9,783,659 B2 | 10/2017 | Park | |
| 10,046,901 B1 | 8/2018 | Jobe | |
| 2001/0051680 A1 | 12/2001 | Webster et al. | |
| 2003/0229168 A1 | 12/2003 | Borsinger et al. | |
| 2006/0003119 A1 | 1/2006 | Aiba | |
| 2006/0196391 A1 | 9/2006 | Hassan et al. | |
| 2012/0193828 A1 | 8/2012 | Chen et al. | |
| 2012/0305010 A1 | 12/2012 | Mishra et al. | |
| 2013/0045308 A1 | 2/2013 | Gorbatenko | |
| 2016/0362842 A1 | 12/2016 | Au | |
| 2017/0217654 A1 | 8/2017 | Harmon | |
| 2019/0040635 A1 | 2/2019 | Baert et al. | |
| 2019/0249369 A1 | 8/2019 | Segal | |

FOREIGN PATENT DOCUMENTS

| | | |
|---|---|---|
| CA | 2746374 A1 | 3/2011 |
| CN | 1145378 A | 3/1997 |
| CN | 1248509 A | 3/2000 |
| CN | 1833841 A | 9/2006 |
| CN | 201023762 Y | 2/2008 |
| CN | 101134881 A | 3/2008 |
| CN | 201033504 Y | 3/2008 |
| CN | 201435981 U | 4/2010 |
| CN | 101804766 A | 8/2010 |
| CN | 101899794 B | 7/2012 |
| CN | 202765406 U | 3/2013 |
| CN | 103215848 A | 7/2013 |
| CN | 103407650 A | 11/2013 |
| CN | 103417050 A | 12/2013 |
| CN | 103711042 A | 4/2014 |
| CN | 104005256 A | 8/2014 |
| CN | 104005257 A | 8/2014 |
| CN | 103052747 B | 10/2014 |
| CN | 104553212 A | 4/2015 |
| CN | 104559273 A | 4/2015 |
| CN | 104562832 A | 4/2015 |
| CN | 104652176 A | 5/2015 |
| CN | 104878655 A | 9/2015 |
| CN | 104911947 A | 9/2015 |
| CN | 105419656 A | 3/2016 |
| CN | 105803855 A | 7/2016 |
| CN | 105908576 A | 8/2016 |
| CN | 106835815 A | 6/2017 |
| CN | 106894278 A | 6/2017 |
| CN | 107012743 A | 8/2017 |
| CN | 107034735 A | 8/2017 |
| CN | 107083723 A | 8/2017 |
| CN | 206374313 U | 8/2017 |
| CN | 107190555 A | 9/2017 |
| CN | 107217547 A | 9/2017 |
| CN | 107354807 A | 11/2017 |
| CN | 107675552 A | 2/2018 |
| CN | 107780292 A | 3/2018 |
| CN | 107955213 A | 4/2018 |
| CN | 108130797 A | 6/2018 |
| CN | 108179654 A | 6/2018 |
| CN | 108677619 A | 10/2018 |
| CN | 108839145 A | 11/2018 |
| CN | 108914675 A | 11/2018 |
| CN | 1108867196 A | 11/2018 |
| CN | 109112892 A | 1/2019 |
| CN | 109266031 A | 1/2019 |
| CN | 109594422 A | 4/2019 |
| CN | 109610225 A | 4/2019 |
| CN | 109837798 A | 6/2019 |
| CN | 109881526 A | 6/2019 |
| CN | 110004763 A | 7/2019 |
| CN | 110055816 A | 7/2019 |
| CN | 110205861 A | 9/2019 |
| CN | 110331623 A | 10/2019 |
| CN | 110373956 A | 10/2019 |
| CN | 209463467 U | 10/2019 |
| CN | 110408072 A | 11/2019 |
| CN | 110528311 A | 12/2019 |
| CN | 110528329 A | 12/2019 |
| CN | 110551301 A | 12/2019 |
| CN | 110578271 A | 12/2019 |
| CN | 110588088 A | 12/2019 |
| CN | 110656542 A | 1/2020 |
| CN | 110820428 A | 2/2020 |
| CN | 111074670 A | 4/2020 |
| CN | 111074686 | 4/2020 |
| CN | 107746584 B | 5/2020 |
| CN | 111172810 A | 5/2020 |
| CN | 111296124 A | 6/2020 |
| DE | 202006003071 U1 | 7/2006 |
| EP | 3199018 A1 | 8/2017 |
| FR | 2821712 B1 | 6/2003 |

(56) References Cited

FOREIGN PATENT DOCUMENTS

| | | | |
|---|---|---|---|
| GB | 422148 | A | 1/1935 |
| JP | 2002012215 | A | 1/2002 |
| JP | 3622181 | B2 | 11/2002 |
| JP | 2005330137 | A | 12/2005 |
| JP | 2008044722 | A | 2/2008 |
| JP | 4908547 | B2 | 4/2012 |
| JP | 2013064204 | A | 4/2013 |
| JP | 2014023443 | A | 2/2014 |
| JP | 5571093 | B2 | 8/2014 |
| JP | 5724553 | B2 | 5/2015 |
| JP | 6268385 | B2 | 1/2018 |
| KR | 20050094808 | A | 9/2005 |
| KR | 100847949 | B1 | 7/2008 |
| KR | 20100050247 | A | 5/2010 |
| KR | 20180127079 | A | 11/2018 |
| KR | 101967041 | B1 | 4/2019 |
| WO | 2001046523 | A2 | 6/2001 |
| WO | 2006042444 | A1 | 4/2006 |
| WO | 2013137791 | A1 | 9/2013 |
| WO | 2018190701 | A1 | 10/2018 |
| WO | 2020041409 | A1 | 2/2020 |

OTHER PUBLICATIONS

Endo et al., Journal of Oleo Science 68(8), 739-745 (2019).*
Mohan et al., Agricultural Reviews 10.18805/ag.R-2055, 2020, pp. 1-7.*
"The Complete Technology Book on Wax and Polishes" by NIIR Board of Consultants and Engineers, published by Asia Pacific Business Press Inc., Delhi, India, 2006, p. 181.*
Kao Wax EB-FF Product Information (Year: 2017).*
Nippon Seiro Product Information (Year: 2021).*
Sysco, "#3 Take Out Carton Natural."
Kottasova, Ivana. "Latte Levy: Disposable Coffee Cups Should be Taxed, Say UK Lawmakers," money.cnn.com, Jan. 5, 2018, http://money.cnn.com/2018/01/05/news/coffee-cup-latte-levy/index.html.
Gold, Michael. "A Long-Awaited Ban on Foam, and Other New Laws in New York in 2019," New York Times, Dec. 31, 2018, https://nyti.ms/2RpsaHs.
Hamblin, James. "A Brewing Problem," The Atlantic, Mar. 2, 2015, theatlantic.com/technology/archive/2015/03/the-abominable-k-cup-coffee-pod-environment-problem/386501/.
"Amended Final Report on the Safety Assessment of Oryza Sativa . . . " 25(suppl. 2) International Journal of Toxicology 91-120, 2006.
"GRAS Notice Inventory | FDA." U.S. Food and Drug Administration, http://www.fda.gov/Food/IngredientsPackagingLabeling/GRAS/NoticeInventory/default.htm. Accessed Oct. 22, 2020.
U.S. Food and Drug Administration, http://www.fda.gov/Food/IngredientsPackagingLabeling/GRAS/NoticeInventory/default.htm. Accessed Oct. 22, 2020.
Kottasová, Ivana. "Latte Levy: Disposable Coffee Cups Should Be Taxed, Say UK Lawmakers." CNNMoney, Jan. 5, 2018, http://money.cnn.com/2018/01/05/news/coffee-cup-tax-latte-levy/index.html.
Gold, Michael. "A Long-Awaited Ban on Foam, and Other New Laws in New York in 2019—The New York Times." The New York Times—Breaking News, US News, World News and Videos, Dec. 31, 2018, http://nytimes.com/2018/12/31/nyregion/styrofoam-ban-new-laws-ny.html.
Hamblin, James. "How Bad Are K-Cups for the Environment?—The Atlantic." The Atlantic, The Atlantic, Mar. 2, 2015, http://theatlantic.com/technology/archive/2015/03/the-abominable-k-cup-coffee-pod-environment-problem/386501/.

* cited by examiner

| ITEMS | SPECIFICATIONS |
|---|---|
| Melting Point | 77-82 °C |
| Saponification Value | 70-95 |
| Acid Value | ≤ 12 mg KOH/g |
| Iodine Value | ≤ 13 |
| Wax Content | ≥ 95% |
| Oil Content | 0-5% |
| Moisture | 0-1% |
| Impurity | 0-1% |
| Color | ≤ 10 |
| Arsenic (As) | ≤ 3ppm |
| Lead | ≤ 3ppm |

FIG. 15

| ITEMS | SPECIFICATIONS |
|---|---|
| Melting Point | 75-80 °C |
| Saponification Value | 70-100 |
| Acid Value | ≤ 15 mg KOH/g |
| Iodine Value | ≤ 13 |
| Wax Content | ≥ 90% |
| Oil Content | 0-10% |
| Moisture | 0-1% |
| Impurity | 0-2% |
| Color | ≤ 10 |
| Arsenic (As) | ≤ 3ppm |
| Lead | ≤ 3ppm |

FIG. 16

RECYCLABLE COMPOSITION FOR WATERPROOFING PAPER UTILIZING A PLANT DERIVED WAX, PELLETS OF THE COMPOSITION, RECYCLABLE WATERPROOF PAPER LAMINATE INCLUDING THE COMPOSITION, RECYCLABLE HOT BEVERAGE CUP INCLUDING THE LAMINATE, POD FOR MAKING HOT BEVERAGES INCLUDING THE LAMINATE, AND DRINKING STRAW INCLUDING THE LAMINATE

CROSS-REFERENCE TO RELATED APPLICATIONS

This application is related to U.S. provisional application Ser. No. 62/585,962, filed Nov. 14, 2017, Ser. No. 62/599,234, filed Dec. 15, 2017, and 62/659,186, filed Apr. 20, 2018, which are hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to plant-based wax compositions for waterproofing paper.

Description of the Related Art

Cups are used to hold beverages. Historically, cups were made from materials like pottery, glass, metal, and wood. Cups made from such materials were expensive enough, difficult enough to make, and durable enough to justify reusing the cups. A downside to cups made of such materials is that they are too valuable to be disposable. As a result, cups were kept at a location, cleaned, and reused. Users of such cups would finish their beverage and leave their cup behind or return it later so that it can be washed and reused.

Disposable cups, which are made of materials that are cheap enough to be used only once, allow people to drink beverages at locations where there is no dishwasher or to take beverages on the go and never return the cup. After the drinker finishes the beverage, regardless of location, the drinker disposes of the cup in the garbage.

A hidden cost of disposable cups is the disposal costs, which include the cost of moving the disposable cup to a landfill and the environmental cost of allowing the disposable cup to degrade.

To mitigate the hidden cost of disposable cups, a solution might call for recycling the disposable cups. Recycling decreases the hidden costs by decreasing the amount of materials entering landfills. In addition, recycling reduces the hidden cost of depleting raw materials.

Unfortunately, for the reasons detailed below, the most preferred forms of hot beverage containers cannot be recycled in a cost-effective manner.

Cellulose material (e.g. paper and cardboard) is one of the materials commonly used to make disposable, hot beverage containers.

FIG. 2 shows a cup assembly 1 according to the prior art. The cup assembly includes a paper cup 10. The paper cup includes a rim 11, a frustoconical wall 12, and a bottom 13. The rim 11, the frustoconical wall 12, and the bottom 13 are made from coated paper board. Coated paper board includes a layer of paper board 14. Paper board 14 is made from various materials such as wood chips and plants, which have been mashed into pulp, which is then extruded as the paper board 14. The coated paper board includes a plastic coating, which is not visible, applied to the inner surface of the paper board 14. Polyethylene (PE) is the most common plastic coating. The plastic coating prevents the paper board 14 from absorbing moisture from the liquid being held in the paper cup 10. The cup assembly 1 can include an insulating sleeve 20 around the frustoconical wall 12. The insulating sleeve 20 prevents heat transfer from the liquids being held in the paper cup 10. Thereby, the insulating sleeve 20 maintains the temperature of the liquid and prevents a person from burning or freezing his or her hand when holding the paper cup 10. The insulating sleeve 20 is typically made of paper or corrugated cardboard and can be glued around the frustoconical wall 12. The cup assembly 1 can include a paper cup 10 and a lid 30. The lid 30 is typically entirely plastic, a nonrenewable resource. A cup assembly that includes a lid is typically five percent (5%) plastic and ninety-five (95%) paper by weight. Fifty billion ($5 \times 10^{10}$) paper cups in the United States end up in landfills every year. A paper cup takes more than twenty (>20) years to decompose.

Disposable cups for holding hot beverages cannot be made from paper alone. Without additives, cellulose material alone is not a satisfactory material for making hot beverage containers because the cellulose material will soften from absorbing hot water. A cellulose container that has absorbed liquid will become so soft that the container cannot be held without collapsing. Eventually, the cellulose container will absorb enough water that the paper will form a slurry with the water, the paper will tear, and liquids will escape the cellulose container.

To solve the problem of paper alone, additives are used to enhance the waterproofing of the cellulose material.

One such additive is clay. Clay is not favored because clay will dissolve in-part in liquid and can change the color and taste of the liquid. As an alternative to clay, cup manufacturers developed the technique of spraying both the inside and outside of the paper cup with wax.

Paraffin wax is the most common type of wax that is used to coat cups. Paraffin wax is a white or colorless soft solid derivable from petroleum, coal or oil shale, which consists of a mixture of hydrocarbon molecules containing between twenty and forty carbon atoms. Paraffin typically has a melting point between about 46 and 68° C.

In the case of cold beverages, wax can be added to the surface of cup in order to prevent the cellulose material from absorbing water. For example, a paraffin coated milk container is described in U.S. Pat. No. 2,750,095. Wax-paper cups are biodegradable because both component materials (i.e. the paper and the wax) are biodegradable. However, the hidden cost of paraffin wax is increased because paraffin is made from nonrenewable resources.

Unfortunately, paraffin wax-paper cups do not work with hot beverages because the hot beverage warms the paraffin wax to a temperature above its melting point. Because the melting point of paraffin wax is below the temperature of hot drinks, paraffin wax is unsuitable for waterproofing paper that will be used with hot drinks. Hot beverages such as tea, hot chocolate, and coffee are frequently served at temperatures between 71.1° C. and 85° C. However, tests have shown the preferred drinking temperature of coffee is 60° C.+/−8.3° C. Regardless, paraffin and other similar melting point waxes melt when the hot beverage is within the cup. Then, with the wax melted and the layer compromised, the underlying cellulose material becomes exposed to absorb liquid, which leads to failure as discussed previously.

Clay and wax have fallen out of favor following the development of polyethylene (PE)-coated cups. In PE-coated cups, the paper or paperboard is coated with a very thin layer of PE. The PE waterproofs the paper and welds and seals the seams of the cup.

PE-coated cups include a base cup board material that is covered with polyethylene. In such a case, the base paper for paper cups is called "cup board" or "cup stock", and is made on special multi-ply paper machines. A barrier coating for waterproofing is added to the cup board. Cup board has high stiffness and strong wet sizing. The cup board grade has a special design for the cup manufacturing processes. An example of polyethylene coated paper laminate is described in U.S. Pat. No. 5,286,538. The basis weights of the cup boards are 170-350 $g/m^2$.

To meet hygiene requirements, paper cups are generally manufactured from virgin (non-recycled) materials. The one exception to this is when the paper cup features an extra insulating layer for heat retention, which never contacts the beverage, such as a corrugated layer wrapped around a single-wall cup.

Coating paper cups with PE has the side effect of making the PE-coated cup unrecyclable.

Each year, more than one hundred billion ($100 \times 10^9$) disposable cups are sent to landfills in the United States. Approximately fifty-eight billion ($58 \times 10^9$) disposable paper cups are thrown away in the U.S. annually.

Most paper cups are made from plastic-coated, virgin paper. Twenty million ($20 \times 10^6$) trees are harvested to make paper cups each year. In addition, every four paper cups are responsible for creating 0.4 kg of carbon dioxide emissions. Forty-five billion liters ($45 \times 10^9$ l) of water are used to make a year's worth of paper cups. Fifty-three thousand ($53 \times 10^3$) homes could be powered annually with the energy spent making and disposing of paper cups.

The environmental costs of disposable cups of any material is mitigated when the disposable cup is made from a renewable source or from recycled materials. When the disposable cup is made of a renewable or recycled material, the environmental cost for producing the disposable cup is lowered compared to disposable cups made from nonrenewable and virgin materials. When the disposable cup is made from recyclable or biodegradable material, the environmental cost of disposing of the disposable cup is lower compared to cups made from non-recyclable and non-biodegradable materials.

Even though paper and PE are commonly and economically recycled separately, a PE coated paper cup cannot be recycled because the paper and PE must be separate to be recyclable and the PE-coated paper is too difficult and costly to separate the paper from the PE. In other words, the cost of separating the paper from the PE in PE-coated paper cups exceeds any profit that can be made by recycling the resulting paper and PE.

Foam cups are an alternative to paper cups. However, foam cups are also not biodegradable.

Twenty-five billion ($25 \times 10^9$) foam cups are consumed in the U.S. annually. Most foam cups are made from closed-cell extruded polystyrene (PS) foam. An example of closed-cell polystyrene foam is sold under the trademark STYROFOAM®. Polystyrene is a non-biodegradable petroleum-based plastic. Polystyrene contains toxic chemicals that can leach from landfills and threaten human health and reproductive systems. Foam litter is hard to contain because it floats and forms a significant component of land and water pollution. Polystyrene can be fatal when consumed by birds, fish, and wildlife. Polystyrene manufacturing is the fifth large industrial producer of hazardous waste.

Polystyrene is recycled at low rates and languishes in landfills for at least five-hundred 500) years. When polystyrene is incinerated by disposal companies, the incineration produces up to ninety (≤90) toxic and hazardous chemicals.

Cups made entirely (i.e. without paper) of polymers such as polyethylene terephthalate (PET or PETE) and polypropylene (PP) do not provide useful alternatives. Such cups conduct too much heat. As a result, people cannot hold a polymer-only cup that is holding a hot beverage.

Tens of billions of single-use plastic cups trashed at US restaurants, cafes, and events. In the US airline industry alone, nine billion ($9 \times 10^9$) plastic cups are used annually. Plastic creates pollution at every state of its existence: manufacture, use, and disposal. Twenty-eight kilograms (28 kg) of plastic, per person, per year are created in the U.S. Plastic forms up to thirty percent (≤30%) of landfill space.

In 2010, the recycling rate of plastic cups was so small that it was considered negligible.

Plastic trash makes up to eighty percent (≤80%) of all marine debris. It is estimated that we have six times (6×) more plastic trash in our oceans than plankton. Harmful chemicals leached from plastics are present in the bodies of almost every human being, including newborns.

In addition to the paper that cannot be recycled when coated with polyethylene, the polyethylene itself is more difficult to recycle when it is bonded to the paper.

Paper that has a layer of polyethylene applied to it cannot be economically separated from the polyethylene. So, at best, only the polyethylene portion of the coated cup can be recycled after submitting the entire coated cup. The paper portion of the coated cup is typically incinerated and not recycled. More typically, the entire coated cup is merely incinerated, and the polyethylene is not even recycled. As an alternative to incineration, the entire coated cup can be placed in a landfill. The plastic coating retards biodegradation and leads to leaching of pollutants. Once in a landfill, PE coated paper decomposes and releases methane, which is a greenhouse gas.

PE coated paper cups include additional compounds and modifiers that can be toxic including acetaldehyde, trigonelline, malic acid, and potassium ions.

Acetaldehyde is used in the production of perfumes, explosives, and varnishes. Acetaldehyde is also a flavoring additive used to import apple/buttery notes in food. Acetaldehyde is present after consuming alcohol and is responsible for some of the symptoms of a hangover.

Trigonelline is an alkaloid that has a bitter taste.

Potassium Ions $K^+$ are an essential mineral in the body that is used to regulate everything from proper heartbeat, to stable blood pressure, to the polarization of neural membranes.

An additional shortcoming of PE coated paper cups is that they are not microwave compatible. In empty PE coated cups, the polyethylene laminate can ignite when exposed to microwaves. In full PE coated cups, the polyethylene laminate can separate and leach toxins into the drink when microwaved.

Disposable single use coffee pods have become a growing source of pollution. Disposable coffee pods are preferred by customers because they provide a controlled system that produces a consistent tasting beverage. In addition, the single serving size allows each drinker to make a beverage serving that is sized just for themselves.

However, as the popularity of disposable single user pods increases, the pollution from the disposal of the used pods increases.

Single-serving coffee pods sold under the trademarks KEURIG® are not commercially recyclable because they include a mixture of materials that cannot be efficiently separated from each other. U.S. Pat. No. 5,325,765 describes a Beverage Filter Cartridge of this type. The Beverage Filter Cartridge includes a polyethylene cup. A filter is seated in the cup. The filter is permeable to liquids but not coffee grounds. The filter forms two chambers within the cup: a top chamber above the filter and a bottom chamber beneath the filter. A beverage medium, for example, coffee grounds, is placed in the top chamber. A cover is joined to the side wall of the cup at the rim. The cover is aluminum foil with a polyethylene layer applied to its inner surface and ink printed on the top surface.

FIGS. 9-14 show a coffee pod 50 according to the prior art. The coffee pod 50 includes a cup, a filter 60, and a top 80.

To use the pod, the pod is placed into a beverage maker. When the beverage maker is closed, the top is punctured by a sharp water spout to allow water to ingress into the top chamber. At the same time, the bottom of the cup is punctured to allow egress of the brewed beverage.

The components in a disposable coffee pod are recyclable, when separate. The cup is a thermoplastic, for example, polyethylene. The filter is paper. The coffee grounds are essentially cellulose. The cover is aluminum foil. The cover liner is a polyethylene film.

However, to be recyclable, the component materials in the disposable coffee pods must be separated from each other. In practice, the cost of separating the parts is so high that commercial recycling of the pods is not cost effective. As a result, the pods are rejected by recyclers and disposed with other garbage in landfills. The polyethylene and aluminum portions of the disposable pods are not biodegradable and remain effectively forever in landfills.

FIGS. 9-14 show a coffee pod 50 according to the prior art. The coffee pod 50 has a frustoconical wall 52 with a wider top edge and a narrower bottom edge. An annular rim 54 is disposed along the top edge. A bottom 57 is disposed at the narrower bottom edge. The wall 52, rim 54, and bottom 57 are made of one piece of molded polyethylene. A recessed edge 59 is formed at the top of the wall adjacent to the rim 54. A ring 70 is formed on the bottom 57. A circular top 58 is adhered to the rim 54. The top 58 is made of aluminum foil with a polyethylene layer adhered to the top and bottom surfaces of the aluminum foil.

A filter 60 holds grounds, which are not shown, and allows a beverage to pass therethrough. The filter 60 has a wall 64 with a generally frustoconical shape. The wall 64 is pleated. A bottom 62 is connected to the bottom edge of the wall 64. The top edge of the wall 64 is seated in and adhered to the recessed edge 59.

The prior-art coffee pod 50 cannot be recycled because the various component materials in the coffee pod 50 can be separated easily enough to make their recycling economically justified. That is, the polyethylene parts (wall 53, rim 54, and bottom 57) cannot be separated from the cellulose parts (filter 40 and grounds) and the aluminum parts (top 58).

Drinking straws are another source of non-recyclable waste generated by the food and beverage industries. Historically, straws were made with layers of helically wrapped strips of paper. An example of such a paper straw is shown in U.S. Pat. No. 375,962. Like paper cups, untreated paper straws tend to absorb water, become pulpy, and fail. Plastic straws made of polystyrene or polypropylene provided a better working, cheap-to-manufacture alternative to paper straws. However, plastic straws are not biodegradable and are made from non-replenishable resources.

Sugarcane wax naturally occurs within sugarcane. Sugarcane wax is a byproduct of sugar production from sugarcane. Sugarcane wax can be characterized as a wax in which about seventy percent (~70%) of the weight of the wax is composed of alcohols of long-chain hydrocarbons having chain lengths of C 18 to C 32, wax acids having chain lengths of C 18 to C 32, ω-hydroxycarboxylic acids, and aromatic carboxylic acids. Sugarcane wax additionally can include fatty alcohols (wax alcohols) and diols. Besides that, about 5 to 10% of sugarcane wax is composed of unesterified diols, long-chain wax acids such as behenic, cerotic, lignoceric or melissic acid and saturated hydrocarbons.

Emulsions of sugarcane wax can be used to wash fruits and vegetables to give them a gloss and to lengthen shelf life. Sugarcane wax is indigestible and harmless to health. In its refined form it has a light yellowish color. Sugarcane has a melting point between 75 and 80° C.

Rice bran wax is the vegetable wax extracted from the bran oil of rice (*Oryza saliva*). The main components of rice bran wax are aliphatic acids (wax acids) and higher alcohol esters. The aliphatic acids consist of palmitic acid (C16), behenic acid (C22), lignoceric acid (C24), other higher wax acids. The higher alcohol esters consist mainly of ceryl alcohol (C26) and melissyl alcohol (C30). Rice bran wax also contains constituents such as free fatty acids (palmitic acid), squalene and phospholipids. Rice bran wax has a melting point between 77-86° C.

BRIEF SUMMARY OF THE INVENTION

An object of the invention is to provide a composition for producing recyclable, hot-waterproof paper that overcomes the disadvantages of the materials of this general type and of the prior art.

A further object of the invention is to provide pellets of the composition that can be used in existing polyethylene-paper laminate manufacturing machines.

A further object of the invention is to provide a waterproof paper laminate that includes the composition.

A further object of the invention is to provide a recyclable hot beverage cup made from the recyclable water proof laminate.

A further object of the invention is to provide a method for waterproofing paper that includes applying the recyclable waterproof coating to a surface of paper.

A further object of the invention is to provide a method for waterproofing paper that includes a method for manufacturing waterproof cups from the waterproof paper.

A further object of the invention is to provide waterproof paper and cardboard laminates that can be recycled along with other paper without needing processing before disposal.

A further object of the invention is to provide a hot beverage container with a total cost that is less than the total cost of existing disposable hot beverage containers. Total costs include manufacturing costs, material costs, disposal costs, and landfill costs. The environmental advantages of a recyclable paper cup can be measured by not only counting the amount of PE coated cups that will be replaced but by adding the amount of plastic and foam cups that will not be needed.

A further object of the invention is to replace PE coated paper and cardboard with waterproof paper and cardboard that is recyclable, biodegradable, and organic.

A further object of the invention is to provide a recyclable waterproofing composition that can replace polyethylene and be used with existing polyethylene paper-laminate manufacturing machines.

A further object of the invention is to provide a waterproof paper laminate that is recyclable and biodegradable, made from all-natural and recycled material, and The invention offers the end user, products tailored and printed with pigmentation (not conventional chemical inks) to suit customer's establishment and needs.

A further object of the invention is to provide an all-natural, non-petroleum-based laminate made from renewable resources.

A further object of the invention is to provide a product that can be used with existing machines that are currently used in the polyethylene-paper laminate process.

In accordance with the objects of the invention, a composition is provided for waterproofing paper and cardboard. The composition includes a plant-derived wax having a melting point above the temperature for hot drinks, which is at least 60° C. The plant-derived wax should have similar processing qualities as low-density polyethylene (LDPE).

Sugarcane wax and rice bran wax are suitable types of plant-derived waxes. Sugarcane wax and rice bran wax are suitable coatings to waterproof paper because they have melting points above 60° C. and more preferably above 70° C. Sugarcane wax and rice bran wax have similar melting points as LDPE so pellets including sugarcane wax and/or rice bran wax can be used with existing machinery used to coat paper.

Sugarcane wax when applied by itself to paper was found to adhere initially but began to separate from the paper substrate after extended exposure to hot water.

Rice bran wax, without additional waxes, can be extruded onto paper to waterproof the paper for hot drinks. However, after extended exposure to hot liquids, the rice bran wax began to separate from the paper.

To improve the adherence, sugarcane was mixed with similar plant-derived waxes. Rice bran wax was found to be a particularly useful component when mixed with sugarcane wax. A waterproof layer composed of a mixture of sugarcane wax and rice bran wax was found to adhere for extended periods of time and remain waterproof when exposed to hot water.

The adhesion of the composition to paper increased with the percentage of sugarcane wax. In addition, a composition in which sugarcane wax formed at least five percent (≤5%) of the total wax volume was found to effectively adhere to paper for use in hot-drink applications. That is, compositions in which sugarcane wax formed at least five percent of the composition's wax volume were found to be effective to form hot drink cups.

Adhesion of the waterproofing composition was further improved by adding a surfactant to the composition. A food-grade surfactant was selected for safety and recyclability. Calcium stearate was found to be a suitable food-grade surfactant. A composition with at least four tenths percent (0.4%) by volume of surfactant has improved adhesion to paper.

The composition can be formed into pellets according to the following method. The sugarcane wax, rice bran wax, and calcium stearate are ground to a small particle size. Next, the mixture is extruded and chopped into pieces of a desired size. Typically, the pellets are sized the same as the polyethylene pellets that they are replacing. An example pellet size is five millimeters (5 mm) diameter.

The pellets of the waterproofing composition should have properties similar to a polyethylene pellets. By having similar processing requirements, existing machinery that is being used to make PE lined cups can be used with the pellets according to the invention. Low-density polyethylene typically has a melting point between 105 and 115° C.

In accordance with the objects, the invention includes a recyclable waterproof laminate. The laminate can include a cellulose-based product, for example, a sheet of paper or board. On a surface of the cellulose-based product that is intended to face the liquid, a layer of the composition is disposed. A further layer of the composition can be applied to the opposing face of the cellulose-based product. The composition can be adhered directly to the surface of the cellulose-based product. Alternatively, additional layers (for example primers or sizing) can be added between the surface of the cellulose-based product and the layer of composition.

A process and machine of manufacture like the one described in U.S. Pat. No. 4,455,184, which is hereby incorporated by reference, can be used to manufacture the laminate. Pellets of the composition are placed in a hopper of the machine. The pellets are fed to a heater where they are melted. The molten composition is then extruded as a layer of molten composition. The layer of composition is disposed over the surface of the cellulose-based product to be waterproofed. The layers are passed between a pressure roll and a chiller roll to distribute and adhere the layer of composition to the cellulose-based product to produce the laminate.

A recyclable waterproof cup can be formed using the waterproofing composition described previously. In a first case, earlier-manufactured waterproof laminate can be cut and formed into a cup assembly. The cup assembly has a frustoconical wall with a circular bottom seated within the wall. The treated side of the paper is placed facing the inside of the cup. In a second case, a paper cup is assembled from paper that has not been treated with the composition. Then, the completed cup is sprayed with the waterproofing composition.

A further object of the invention is to provide a disposable coffee pod that can be recycled without separating the components. To accomplish this goal, in a disposable coffee pod, the copolymer forming the cup can be replaced with the previously described waterproof laminate, which is made from cellulosed-based products treated with the composition. A spent pod containing waterproof laminate, a paper filter, and used coffee grounds does not need to be separated into its components before recycling because all the components are biodegradable and qualify as paper for recycling.

A further object of the invention is to provide a disposable coffee pods that are commercially recyclable and that will not collapse when used in a coffee maker machine that punctures the top and the bottom of the pod. Examples of coffee maker machines that work by puncturing the disposable coffee pods twice (once at the top, once at the bottom) are the beverage making machines sold under the trademark KEURIG® and NESPRESSO®.

To form a commercially recyclable disposable coffee pod that does not collapse in use, the cup and the top of the pod are made with the waterproof laminate according to the invention. The paper of the cup is strong enough that the cup does not collapse under the compression of the machine as the top and the bottom of the pod are being punctured. At the same time, the paper making the cup, particularly the bottom of the cup, is weak enough to be punctured under the same force. Likewise, the waterproof paper in the top must be puncturable under the normal pressure created during the closing of the machine.

When forming coffee pods from the waterproof laminate, placing the bottom of the cup at a level equal to the bottom of the wall provides coffee pods that are particularly resilient to crushing. Such pods are typically made by starting with a bottom that is slightly wider than the lower opening of the frustoconical wall. Next, the bottom is inserted through the upper hole of the frustoconical wall and pressed downward to the lower opening. As a result, an upward projecting rim extends from upward from the bottom, the rim rests against the inner surface of the frustoconical wall. Adhesive can be used to adhere the outer surface of the rim to the inner surface of the frustoconical wall.

In accordance with the objects of the invention, a biodegradable waterproof drinking straw is provided. A drinking straw formed by helically wrapping paper strips into a tube is described in U.S. Pat. No. 375,962, which is hereby incorporated by reference. According to the invention, sheets of the waterproof laminate are cut into strips. The strips are then wound helically into a tube. The side of the waterproof laminate with the waterproof composition disposed over it forms the inner surface of the drinking straw. Further amounts of the molten composition can be sprayed onto the tube to adhere the rings of the coil to each other in the tube shape. Alternatively, other adhesives can be sprayed onto the tube to hold the rings of the helix in the tube shape.

Other features that are considered as characteristic for the invention are set forth in the appended claims.

Although the invention is illustrated and described herein as embodied in a recyclable composition for waterproofing paper utilizing a plant derived wax, pellets of the composition, recyclable waterproof paper laminate including the composition, recyclable hot beverage cups including the laminate, pods for making hot beverages including the laminate, and drinking straws including the laminate, the invention should not be limited to the details shown in those embodiments because various modifications and structural changes may be made without departing from the spirit of the invention while remaining within the scope and range of equivalents of the claims.

The construction and method of operation of the invention and additional objects and advantages of the invention is best understood from the following description of specific embodiments when read in connection with the accompanying drawings.

BRIEF DESCRIPTION OF THE SEVERAL VIEWS OF THE DRAWING

FIG. 15 is a table showing the specifications of a first preferred embodiment of rice-bran wax.

FIG. 16 is a table showing the specifications of a second preferred embodiment of rice-bran wax.

DETAILED DESCRIPTION OF THE INVENTION

A preferred embodiment of a composition for waterproofing paper includes a mixture of sugarcane wax, rice-bran wax, and calcium stearate. The rice bran wax forms 95% of the composition by volume. The sugarcane wax forms 4.6% of the composition by volume. The calcium stearate forms 0.4% of the composition by volume.

A first preferred embodiment of the rice-bran wax is sold under the trade name RICE BRAN WAX 1# by Wuxi AccoBio Biotech, Inc. The first preferred embodiment of the rice-bran wax has the specifications shown in FIG. 15.

A second preferred embodiment of the rice-bran wax is sold under the trade name RICE BRAN WAX 2# by Wuxi AccoBio Biotech, Inc. The second preferred embodiment of the rice-bran has the specifications shown in FIG. 16.

The calcium stearate is commercially available.

Figure 1:
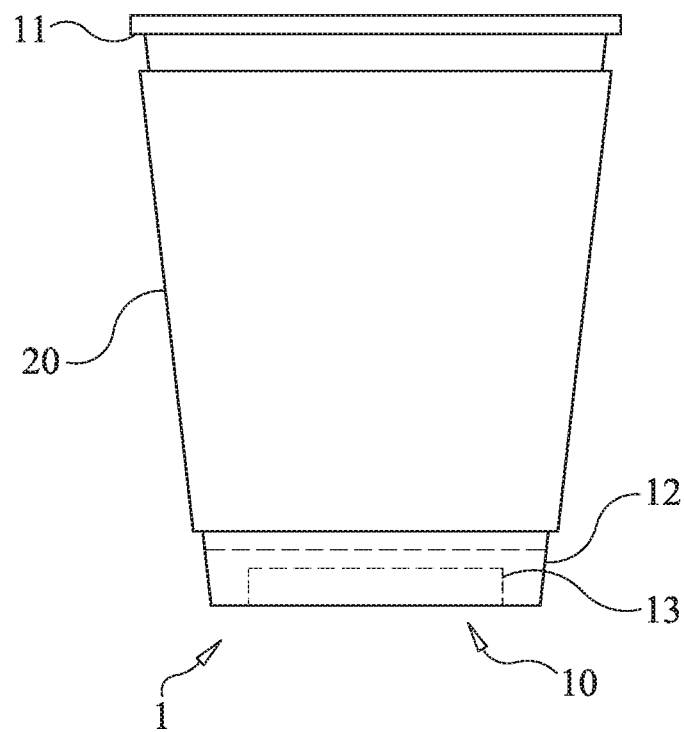
FIG. 1 is a side elevational view of a cup assembly with an insulating sleeve.
Figure 2:
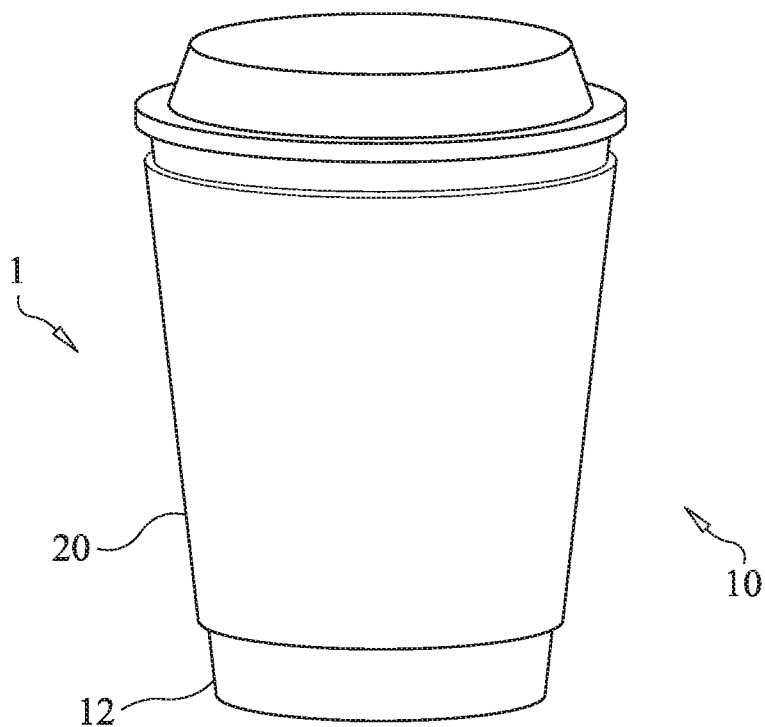
FIG. 2 is a top perspective view of a cup with a lid according to the prior art.
Figure 3:
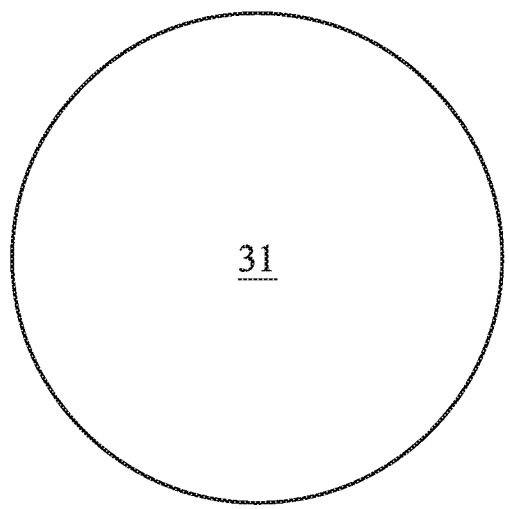
FIG. 3 is a top elevational view of a coffee pod according to the invention.
Figure 4:
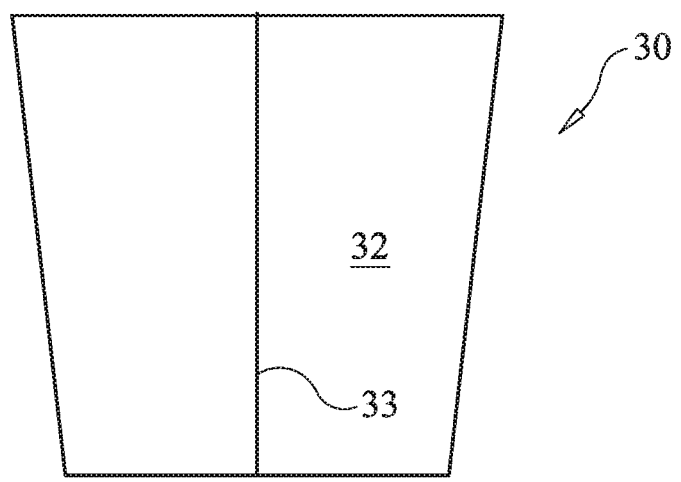
FIG. 4 is a front elevational view of the coffee pod shown in FIG. 3.

FIG. 1 shows a preferred embodiment of a cup assembly 1. Laminate made with a layer of cup stock and an extruded layer of the waterproofing composition is cut to provide two pieces: the first piece will form the frustoconical wall 12 and the second piece will form the circular bottom 13. The cup assembly 1 includes a paper cup 10. The paper cup 10 has a frustoconical wall 12 and a circular bottom 13 seated within the frustoconical wall 12. The pieces of laminate are arranged with the waterproofed, extruded layer facing the inside of the cup. A top rim 11 is formed at the top of the frustoconical wall 12. An insulating sleeve 20 is placed around the paper cup 1. A bottom rim 15 extends downward from the bottom 13 and underlaps the frustoconical wall 12.

FIGS. 3-8 show a preferred embodiment of a coffee pod 30. Although the term of art is "coffee" pod, the pods according to the invention can be used with other steeped hot beverages including, but not limited to tea and cocoa.

Figure 5:
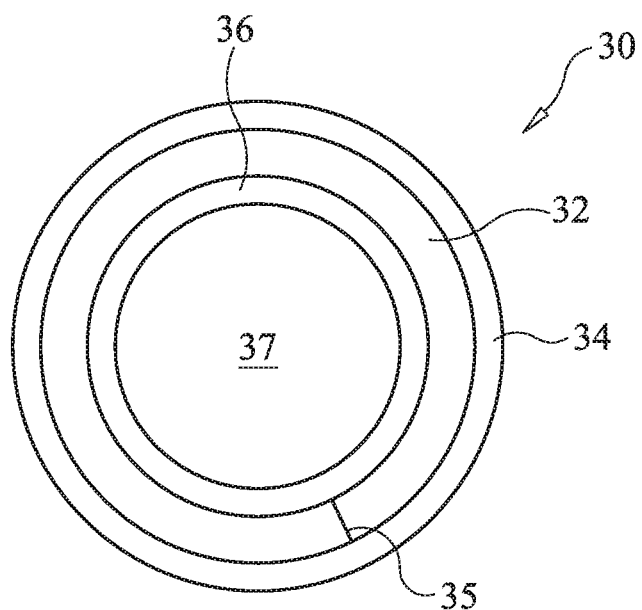
FIG. 5 is a top elevational view of the coffee pod shown in FIG. 3 with the top and filter removed.
Figure 6:
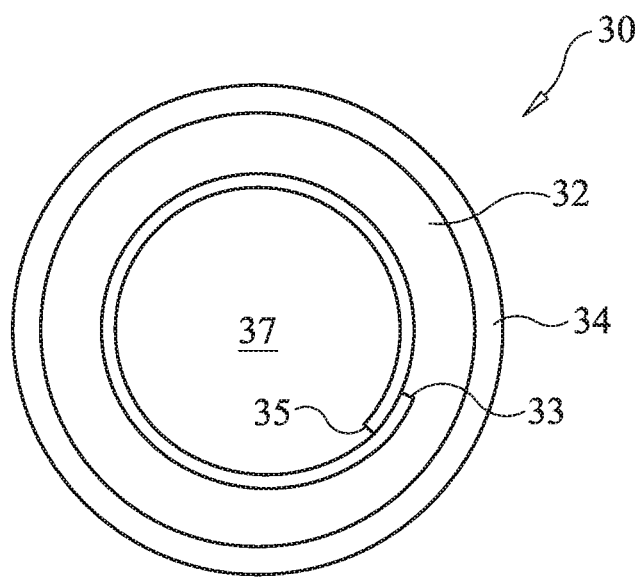
FIG. 6 is a bottom elevational view of the coffee pod shown in FIG. 3.
Figure 8:
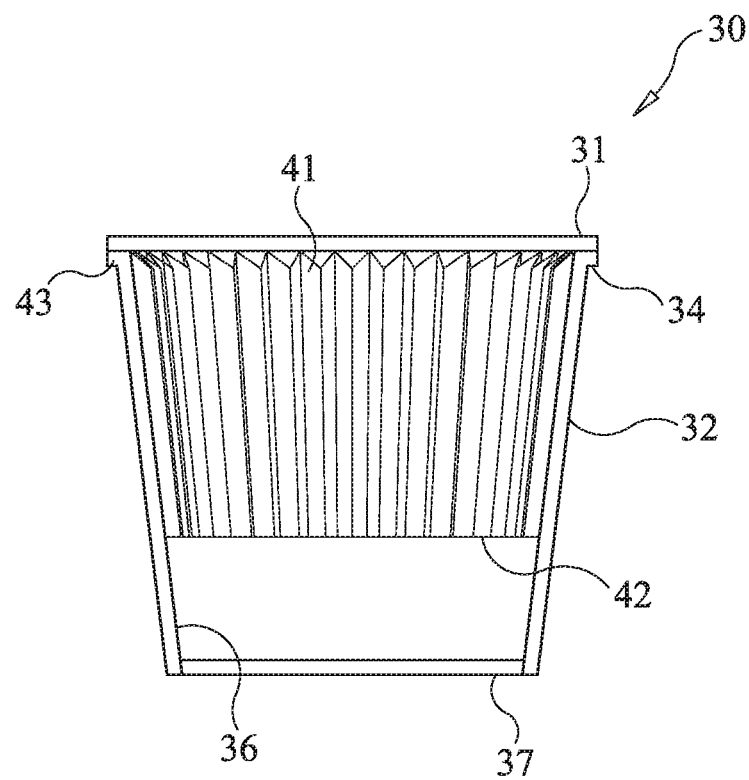
FIG. 8 is side sectional view of the coffee pod shown in FIG. 3.
Figure 9:
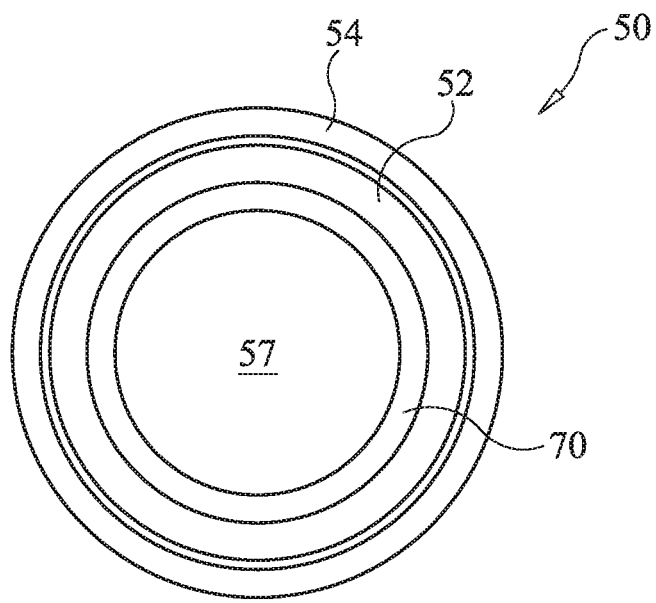
FIG. 9 is a bottom elevational view of a coffee pod according to the prior art.
Figure 10:
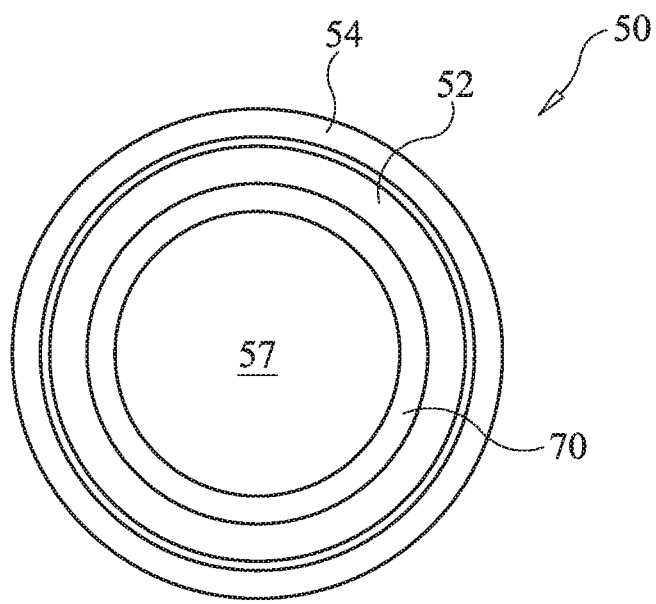
FIG. 10 is a top elevational view of the coffee pod shown in FIG. 9 with the top and filter removed.
Figure 11:
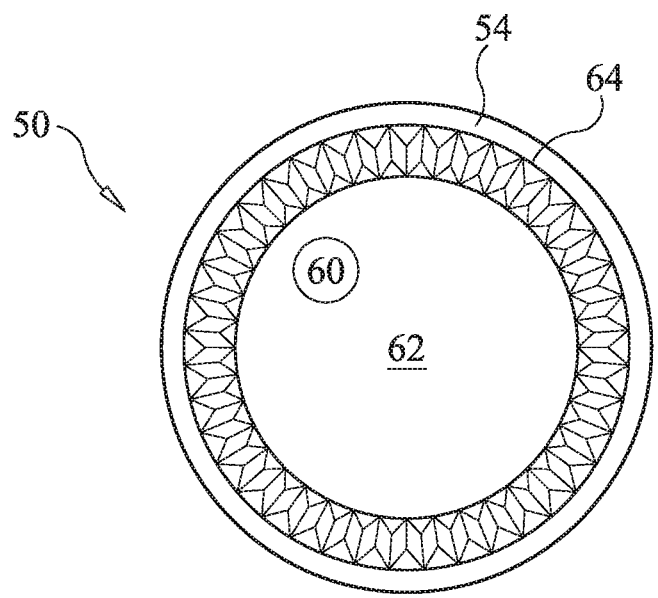
FIG. 11 is a top elevational view of the coffee pod shown in FIG. 9 with the top removed and the filter in place.
Figure 12:
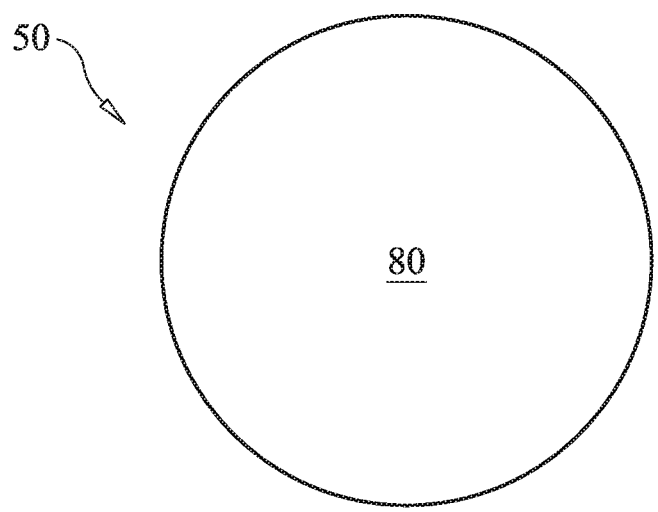
FIG. 12 is a top elevational view of the coffee pod shown in FIG. 9.
Figure 13:
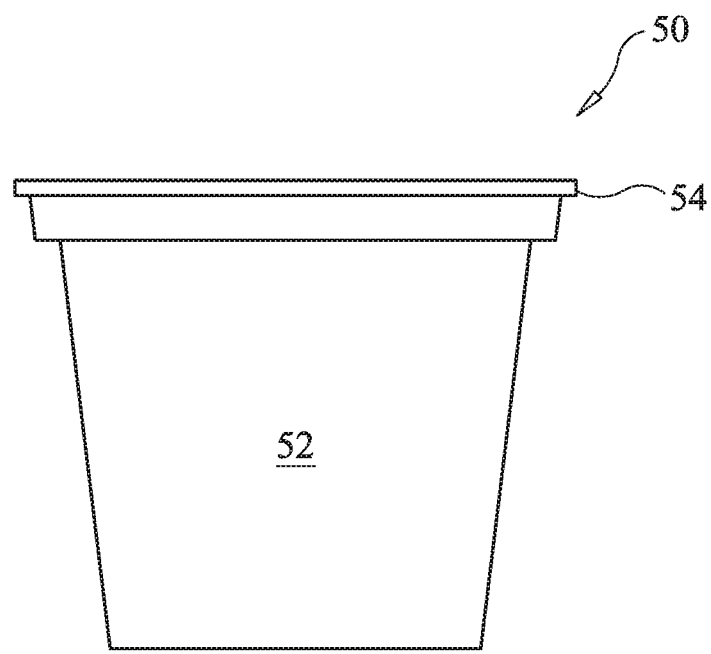
FIG. 13 is a side elevational view of the coffee pod shown in FIG. 9.
Figure 14:
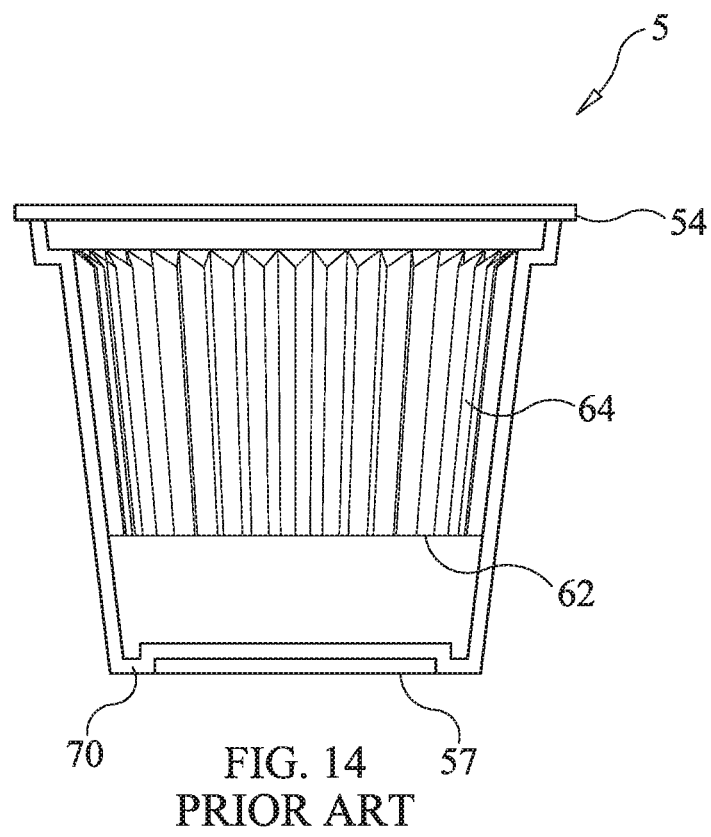
FIG. 14 is a side sectional view of the coffee pod shown in FIG. 9.

As shown in FIGS. 5-6 and 8, the coffee pod 30 has a bottom 37 with an upward extending crimped edge 36. A frustoconical wall 32 encircles the crimped edge 36. The frustoconical wall 32 is made by wrapping a frustoconical wall 32 onto itself to define an outer seem 33 and an inner seem 35. A rim 34 is folded into the top edge of the frustoconical wall 32.

The bottom 37 and the frustoconical wall 32 are stamped from waterproof laminate. The preferred embodiment of the waterproof laminate has a first layer of cup board and a second layer of the extrusion adhered to the cup board. The stamped parts 37 and 32 are folded and assembled with the waterproof composition layer of the laminate facing inward. To further waterproof the coffee pod, the interior of the coffee pod, particularly the seams of the coffee pod can be sprayed with melted waterproof composition.

An alternative preferred method of making the coffee pods is to place the waterproof laminate in a mold. The pressure of the mold produces a unibody cup shape.

Figure 7:
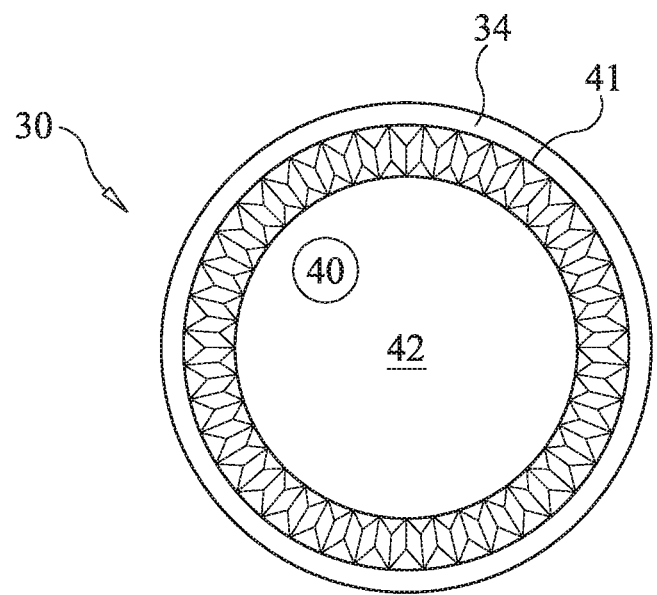
FIG. 7 is a top elevational view of the coffee pod shown in FIG. 3 with top removed and the filter in place.

As shown in FIGS. 7-8, a filter 40 has a frustoconical wall 44. A rim 43 is disposed at the top edge of the wall 44. A bottom 42 is disposed at the bottom edge of the frustoconical wall 44. The wall 44 has pleats 41 folded therein. The filter 40 is made from paper that permeable to the beverage but not to grounds held in the filter 40. The rim 43 is congruent with the rim 34. The rim 43 of the filter 40 is adhered to the rim 34. The height of the wall 44 of the filter 40 is shorter than the height of the wall 32 of the coffee pod 30. By being shorter, a space is defined in the coffee pod between the bottom 37 of the coffee pod and the bottom 42 of the filter 40. The space is great enough to allow a drain to pierce the bottom 37 but not pierce the 42.

A top 38 is adhered to the rim 43. The top is circular and is made of cup board treated with the waterproofing composition.

To make a beverage, a coffee maker is opened. The coffee pod 30 is placed in the coffee maker. Next, the coffee maker is closed. As the coffee maker closes, a nozzle pierces the top 38 and a drain pierces the bottom 37 but does not pierce the bottom of 42 of the filter 40. Water that has been heated by the coffee maker flows through the nozzle and mixes with coffee grounds held within the filter 40. As the water mixes with the grounds, a beverage is produced. The beverage flows through the filter 40 and exits the coffee pod 30 through the drain, which has pierced the bottom 37 of the coffee pod 30.

A preferred embodiment of a drinking straw is a helically wound strip of the waterproof laminate made with the waterproofing composition and cup board. The laminate is arranged with the waterproofing layer on the inside of the straw. A preferred machine for making the recyclable waterproof drinking straws are sold under the model name HT-50 and produced by Honeytop Machinery.

The invention has been described in an illustrative manner, and it is to be understood that the terminology which has been used is intended to be in the nature of words of description rather than of limitation.

What is claimed is:

1. A composition for waterproofing paper, comprising:
a first plant-derived wax having a melting point above 70° C.;
a second plant-derived wax having a melting point above 70° C.;
a surfactant; and
at least 99.6% by weight of the composition is formed by plant-derived waxes including at least said first plant-derived wax and said second plant-derived wax, and a group of surfactants including at least said surfactant.

2. The composition according to claim 1, wherein said first plant-derived wax is sugarcane wax.

3. The composition according to claim 1, wherein said first plant-derived wax is rice-bran wax.

4. The composition according to claim 1, wherein:
said first plant-derived wax is sugarcane wax; and
said second plant-derived wax is rice bran wax.

5. The composition according to claim 1, wherein said surfactant is a food-grade surfactant.

6. The composition according to claim 1, wherein said surfactant is an anionic surfactant.

7. The composition according to claim 1, wherein said surfactant is calcium stearate.

8. The composition according to claim 2, wherein said sugarcane wax forms at least four percent of the composition by volume.

9. A composition for waterproofing paper, comprising:
sugarcane wax; and
a second plant-derived wax having a melting point above 70° C.;
said sugarcane wax forming 4.6% of the composition by volume.

10. The composition according to claim 7, wherein said calcium stearate forms at least 0.4% of the composition by volume.

11. The composition according to claim 1, wherein at least one of said first plant-derived wax and said second plant-derived wax includes a wax having an alcohol of a hydrocarbon with a chain length of at least eighteen carbon atoms and no more than thirty-two carbon atoms.

12. The composition according to claim 11, wherein said wax having an alcohol of a hydrocarbon with a chain length of at least eighteen carbon atoms and no more than thirty-two carbon atoms forms about seventy percent of a weight of all alcohols in said wax.

13. A pellet for use in a PET pellet machine, comprising:
a pellet having a size with a five-millimeter diameter;
said pellet including:
a first plant-derived wax having a melting point above 70° C.,
a second plant-derived wax having a melting point above 70° C., and
a surfactant,
at least 99.6% by weight of the composition is formed by plant-derived waxes including at least said first plant-derived wax and said second plant-derived wax, and a group of surfactants including at least said surfactant.

14. Pellets of a composition for waterproofing paper made according to a method, which comprises:
grinding a first plant derived wax having a melting point above 70° C.;
grinding a second plant derived wax having a melting point above 70° C.;
grinding a surfactant;
mixing said first plant derived wax, said second plant derived wax, and said surfactant into a mixture after grinding, at least 99.6% by weight of the mixture being formed by plant-derived waxes including at least said first plant-derived wax and said second plant-derived wax, and a group of surfactants including at least said surfactant;

extruding said mixture; and chopping said mixture after extruding into pellets.

15. A waterproof laminate, comprising:

a cellulose-based product having a first surface for facing a liquid and a second surface opposing said first surface; and a layer of the composition according to claim 1 for waterproofing said cellulose-based product, said layer being disposed over said first surface.

16. The waterproof laminate according to claim 15, wherein said cellulose-based product is paper.

17. A cup for holding a hot liquid, comprising:

an enclosed wall made of paper, said wall having an inner surface for facing the hot liquid;

a bottom made of paper, said bottom being seated within said wall and having a top surface for contacting the hot liquid; and a layer of the composition according to claim 1, said layer being disposed over said inner surface and said top surface of said bottom.

18. A pod for making a hot beverage, comprising:

the cup according to claim 17; and a filter being connected to said wall to create a chamber for holding grounds within the cup above said filter, said filter being permeable to liquids and impermeable to the grounds.

19. The pod according to claim 18, further comprising a top being configured to be pierced by an injector, said top covering said cup;

said wall being rigid enough not to collapse when the injector pierces said top and a drain pierces said bottom.

20. A straw for drinking beverages, comprising:

a tube of paper having an inner surface; and a layer of the composition according to claim 1 being disposed over said inner surface.

* * * * *